(12) United States Patent
Borges (10) Patent No.: US 10,750,324 B2
(45) Date of Patent: Aug. 18, 2020

(54) MIXED-MODE WIRELESS SCANNER

(71) Applicant: CONNECTDATA TECHNOLOGIES DO BRASIL LTDA., São Paulo (BR)

(72) Inventor: Gabriel Ribeiro Borges, São Paulo (BR)

(73) Assignee: Connectdata Technologies do Brasil LTDA., Sao Paulo (BR)

( * ) Notice: Subject to any disclaimer, the term of this patent is extended or adjusted under 35 U.S.C. 154(b) by 0 days.

(21) Appl. No.: 16/535,631

(22) Filed: Aug. 8, 2019

(65) Prior Publication Data

US 2020/0053512 A1 Feb. 13, 2020

Related U.S. Application Data

(60) Provisional application No. 62/717,253, filed on Aug. 10, 2018.

(51) Int. Cl.
*H04W 4/029* (2018.01)
*G06Q 10/08* (2012.01)
*H04W 8/00* (2009.01)
*H04W 4/80* (2018.01)

(52) U.S. Cl.
CPC .......... *H04W 4/029* (2018.02); *G06Q 10/087* (2013.01); *H04W 4/80* (2018.02); *H04W 8/005* (2013.01)

(58) Field of Classification Search
CPC ....... H04W 4/029; H04W 4/80; H04W 8/005; G06Q 10/087

USPC ....................................................... 455/456.1
See application file for complete search history.

(56) References Cited

U.S. PATENT DOCUMENTS

| 9,635,108 B2 * | 4/2017 | Thomas | ................. H04L 67/42 |
| 2014/0125502 A1 * | 5/2014 | Wittkop | ................. G08G 1/127 340/989 |
| 2014/0240776 A1 * | 8/2014 | Suzuki | ................. G06F 3/1296 358/1.15 |
| 2014/0281547 A1 * | 9/2014 | Modzelewski | ..... H04L 63/0492 713/171 |
| 2016/0061957 A1 * | 3/2016 | Li | ........................... G01S 19/47 342/357.42 |
| 2018/0014150 A1 * | 1/2018 | Elias | ................... H04L 63/0861 |

* cited by examiner

*Primary Examiner* — Mong-Thuy T Tran
(74) *Attorney, Agent, or Firm* — Pilloff Passino & Cosenza LLP; Sean A. Passino; Rachel K. Pilloff (57) ABSTRACT

An electronic scanning apparatus comprises a first wireless receiver configured to receive a first data. A second wireless receiver configured to initially be in a disabled mode. The second wireless receiver is enabled to receive a second data in response to reception of the first data by the first wireless receiver. The second wireless receiver returns to the disabled mode in response to receiving the second data. A processing module is coupled to the first wireless receiver and the second wireless receiver. A networking interface is coupled to the processing module. The networking interface is configured to receive the first data and the second data from the processing module and to transmit the first data and the second data to an external server. A Smart Tag includes both a first wireless receiver and a second wireless receiver.

10 Claims, 8 Drawing Sheets

| Type of Values | BLE BEACON 118 | | | RFID TAG 112 |
|---|---|---|---|---|
| | TLM | Ibeacon | itag | |
| Individual (Optional) | frame_type version battery temperature count time_since_boot | uuid, major minor, tx_power manufacturer | name, type, flags services_16b appearance | uuid |
| Mandatory | timestamp, scanner_id, scanner_mac, type | | | |

MIXED-MODE WIRELESS SCANNER

CROSS REFERENCE TO RELATED APPLICATIONS

This application claims the benefit of U.S. Provisional Application No. 62/717,253, filed Aug. 10, 2018, which is incorporated by reference herein in its entirety.

BACKGROUND

Filed of the Invention

The present invention relates to scanners and readers for contactless, wireless tags and more particularly to mixed-mode scanners for the detection and tracking of tags supporting multiple protocols.

Description of the Related Art

There exist many solutions in the art for the tracking of assets in commerce and industry. One well known solution is the use of radio frequency tags such as RFID tags. NFC tags are a type of RFID tag that uses higher frequencies and has a higher storage capacity and this specification will use the term RFID to refer to both of these technologies.

These low cost tags typically take the form of small semiconductor chips embedded on material such as an adhesive paper with a printed antenna. The tags are passive and are powered by a current induced by the RF field of a scanner.

RFID tags are able to store a few hundred bits of data that can be read by a scanner. NFC tags are able to store approximately 100 bytes to several thousand bytes of data. RFID tags are meant to be read at a short distance. Depending on the technology and frequencies used, this distance that a tag can be read from varies from just a few centimeters to several meters. The data transfer rate from an RFID tag is dependent on the frequencies used but is typically in the range of 10s of kbps.

Drawbacks of using RFID tags are that the range is limited, and that the data reported by a tag is limited in the information it may provide.

Bluetooth low energy (BLE) is a short range, low power wireless technology designed for low cost and long battery life. BLE beacons are powered transmitting devices that broadcast their identity to devices within range. BLE is typically implemented in a semiconductor IC, either stand alone, or incorporated as a module within a larger chip. A BLE beacon will also include a CPU, memory, antenna, and power supply. BLE beacons may have a variety of form factors, some based on housing a coin battery, some based on a USB stick or USB dongle. BLE devices may be full featured, sophisticated devices with a large amount of storage. Data transfer rates are up to several Mb/s with a range of several 10s of meters indoors and up to a few hundred meters outdoors.

Drawbacks of BLE beacons is that when used at long range and at high power, battery consumption may be too high for many applications.

The construction industry is one example of an industry with a large amount of high value equipment and raw materials and the accurate tracking of equipment, material, and personnel is beneficial in order to better manage construction sites. There exists a need to efficiently utilize tracking tags to better manage construction projects and inventory that overcomes the technical constraints of the different wireless tag solutions.

BRIEF SUMMARY

A first major aspect of the invention includes an electronic scanning apparatus comprising a first wireless receiver configured to receiver a first data. A second wireless receiver configured to initially be in a disabled mode. The second wireless receiver is enabled to receive a second data in response to reception of the first data by the first wireless receiver. The second wireless receiver returns to the disabled mode in response to receiving the second data. A processing module is coupled to the first wireless receiver and the second wireless receiver. A networking interface is coupled to the processing module. The networking interface is configured to receive the first data and the second data from the processing module and to transmit the first data and the second data to an external server.

In further embodiments, the first data is received from a first asset tracking device and the second data is received from a second asset tracking device.

In a further embodiment, the first data and the second data are converted into a common format before being transmitted to the external server.

Another embodiment comprises a location detection module configured to receive location data of the electronic scanning apparatus. The networking interface transmits the location data to the external server.

In another embodiment, the location detection module is configured to initially be in a disabled mode. The location detection module is enabled to receive the location data when movement of the electronic scanning apparatus is detected.

In a further embodiment, the location detection module is configured to become enabled if the location data has not been received within a predetermined time period.

In another embodiment, the location detection module is configured to become enabled if the location data has not been included with the first data or with the second data.

Further embodiments comprise a local storage. The first data and the second data are stored in the local storage prior to transmitting the first data and the second data to the external server. The processing module deletes the first data and the second data from the local storage after receiving an acknowledgement from the external server that the first data and the second data have been successfully received by the external server.

A second major aspect of the invention includes a method for tracking assets. The method comprises reading, by a first wireless receiver, a first data from a first asset tracking device. In response to reading the first data, enabling a second wireless receiver. The second wireless receiver reads a second data from a second asset tracking device. The first asset tracking device and the second asset tracking device are associated with an asset. The second wireless receiver is disabled after the second data is received. Transmitting, by a networking interface, the first data and the second data to an external server.

A further embodiment comprises, converting, by a processing module the first data and the second data into a common format before being transmitted to the external server.

A further embodiment comprises receiving, by a location detection module, location data of the asset, and the networking interface transmitting the location data to the external server.

Another embodiment comprises, prior to the location detection module receiving the location data, the location detection module being in a disabled mode, and the location detection module being enabled to receive the location data in response to movement of the asset being detected.

Another embodiment comprises, prior to the location detection module receiving the location data, the location detection module being in a disabled mode, and the location detection module being enabled to receive the location data in response to no location data being received within a predetermined time period.

A further embodiment comprises receiving, by the first wireless receiver or the second wireless receiver, location data of the asset, and the networking interface transmitting the location data to the external server.

A further embodiment comprises configuring a location detection module in a disabled mode.

Another embodiment comprises storing, by a processing module into a local storage, the first data and the second data prior to transmitting the first data and the second data to the external server. The processing module deletes the first data and the second data from the local storage after receiving an acknowledgement from the external server that the first data and the second data have been successfully received by the external server.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

The present invention is direct to a scanner supporting multiple wireless tags and beacons and more particularly to a scanner that reads data from both RFID tags and BLE beacons. Embodiments of the invention may be used for asset and personnel tracking and supply chain management in widely spaced, harsh environments such as construction sites, mines, and others.

One broad aspect of the invention comprises a combined RFID reader and BLE beacon scanner which may be a mobile device or fixed in place in a warehouse, vehicle, gatehouse, or other location. The scanner may also be a mobile device worn by a person.

Tags or beacons may be attached to equipment, material, personnel, and any other asset that is tracked. The tags or beacons may be attached directly to the asset or to a container that holds the asset or a group of assets.

Figure 1:
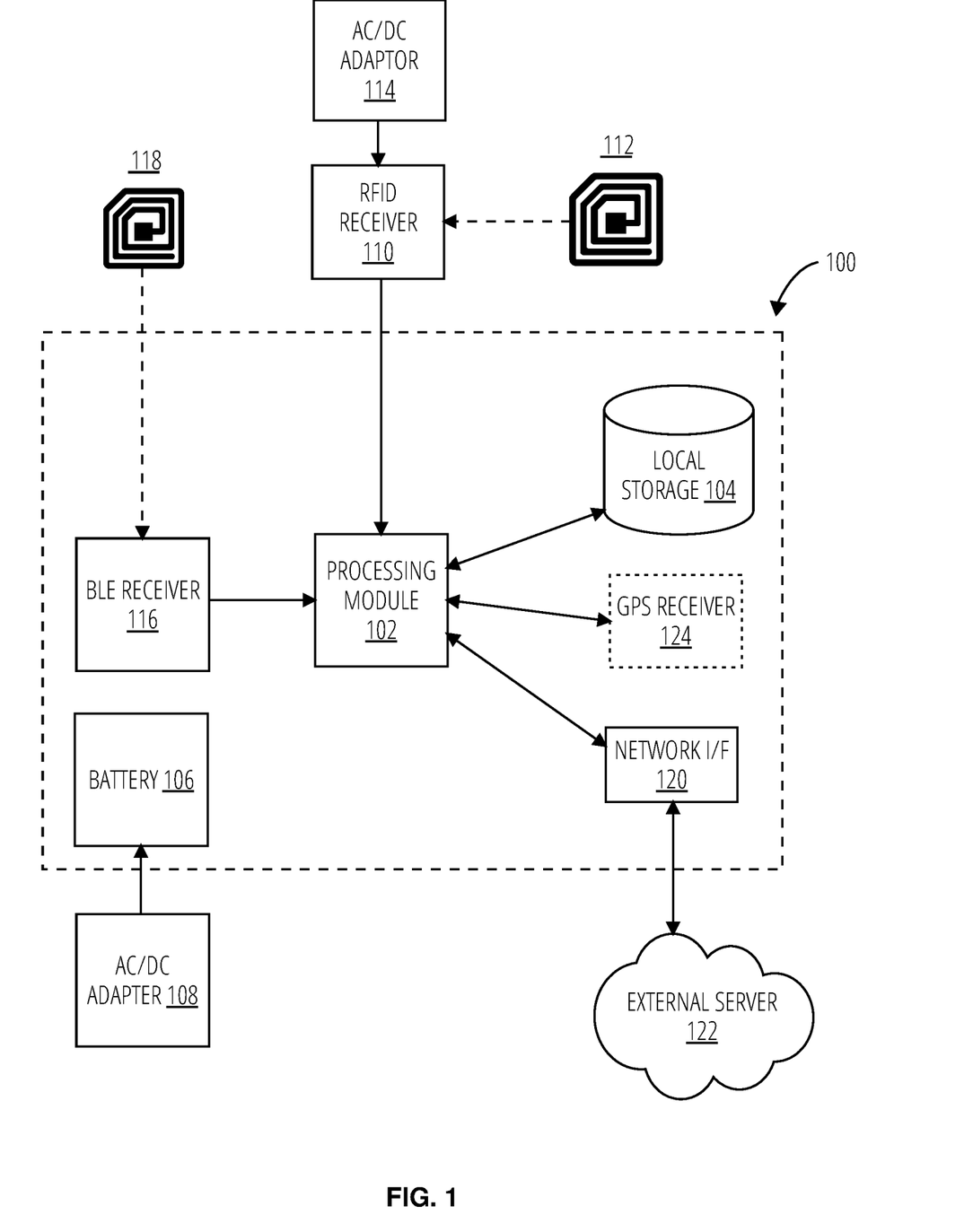
FIG. 1 illustrates a scanner 100 in accordance with one embodiment.

Referring to FIG. 1 a scanner 100 is integrated in a housing and includes a processing module 102, local storage 104, and a networking interface 120. Optionally, it may also include a GPS receiver 124. The processing module 102 comprises a microprocessor, microcontroller, or other type of CPU as is known in the art. The processing module 102 will also run an OS, such as Linux, and various software packages. It also comprises additional circuitry and memory as is known in the art. Local storage 104 comprises non-volatile or volatile memory used to store a local database. In the case that volatile memory is used, it may have a battery backup. Local storage 104 may take the form of RAM, ROM, Flash, as well as removable memory such as SD-cards, solid-state disks (SSD) and similar. Local storage 104 is used to store data read from BLE beacon 118 or RFID tag 112 before sending it to an external server 122 through the networking interface 120. In some embodiments, data is sent to the external server 122 using a REST API. In some embodiments data is preserved in the local storage 104, in other embodiments, data is deleted from the local storage 104 after it has been transferred to the external server 122.

The networking interface 120 may be any wired or wireless network interface and support any suitable networking protocol including Ethernet, WiFi, or GSM cellular data protocols, XBee, LoRa or any other Low-Power Wide-Area Network (LPWAN) technology. Multiple wireless protocol connections may substitute for each other or be used to complement each other. In some embodiments, the networking interface 120 implements GPRS protocols or WiFi (IEEE 802.11) protocols. In some embodiments multiple networking protocols will be supported such as WiFi and GPRS. The use of multiple interfaces may be rule based. For example, if there is a charge for GPRS use over the cellular network, WiFi may be preferred. In the case of and intermittent network connection, data is stored in the local storage 104 until the network connection to the external server 122 is restored.

The scanner 100 is powered by a Battery 106, AC/DC adapter 108, or a combination of the two. In some embodiments, the Battery 106 will be rechargeable, such as a lithium-ion battery. Power conversion circuitry may be used to boost the battery voltage to voltages required by the circuits and components of the scanner 100. The AC/DC adapter 108 will be used to recharge the Battery 106 as required. The Battery 106 may be of sufficient capacity to power the scanner 100 during the longest possible period where AC power may not be available. The AC/DC adapter 108 may support 110V, 220V, or both and may support both 50 and 60 Hz power.

Embodiment of the invention support interfaces with both BLE beacons and RFID tags. A BLE receiver 116 is incorporated with the scanner 100 to support communications with an external BLE beacon 118 or several tags. An RFID receiver 110 is also incorporated, either internally or externally, to support communication with an external RFID tag 112 or several. If external, the RFID receiver 110 may be fixed to the scanner 100 through a connector or connected through a longer cable. Connections between the processing module 102 and the RFID receiver 110 may be a serial port such as RS-232, USB, or I²C. The RFID receiver 110 may consume significant power and in some embodiments will have its own AC/DC adaptor 114.

For embodiments where the scanner 100 may be used in a harsh or remote environment, it will be ruggedized and hardened against vibration, impact, dust, moisture, water, and any other expected environmental conditions.

In some embodiments, different assets will have an RFID tag 112, a BLE beacon 118, or both affixed to them. In some embodiments, a combined RFID tag 112 and BLE beacon 118 may be used. Depending on the asset, it may be affixed to the asset itself or to an enclosure holding the asset or several of the assets. The process starts with the scanner 100 reading a BLE beacon 118. At approximately the same time, the scanner may also receive data from an RFID tag 112. Information from both the BLE beacon 118 and the RFID tag 112 is stored in the local storage 104. Periodically, the processing module 102 sends data through the networking interface 120 to the external server 122 using the HTTP protocol. The external server 122 returns an acknowledgement that the data has been received, allowing the processing module 102 to delete the data from local storage 104.

An optional GPS receiver 124 module may also be included to report the location of the scanner. It is understood that location data may also be obtained from other internal or external sources.

BLE beacon 118 will preferably be of the TLM type that supports the Eddystone protocol. The Eddystone protocol interleaves TLM and URL frame formats. TLM frames includes proximity and location data that allows the beacon to be used in fleet maintenance applications. The Eddystone protocol also supports the transmission of battery level information for cases where the BLE beacon 118 is battery powered.

Firmware is provided and executed by the processing module 102 to enable scanner 100 functions. Different program modules may be used to read the BLE beacon 118, to read the RFID tag 112, and to communicate data over the networking interface 120 to the external server 122.

Figure 2:
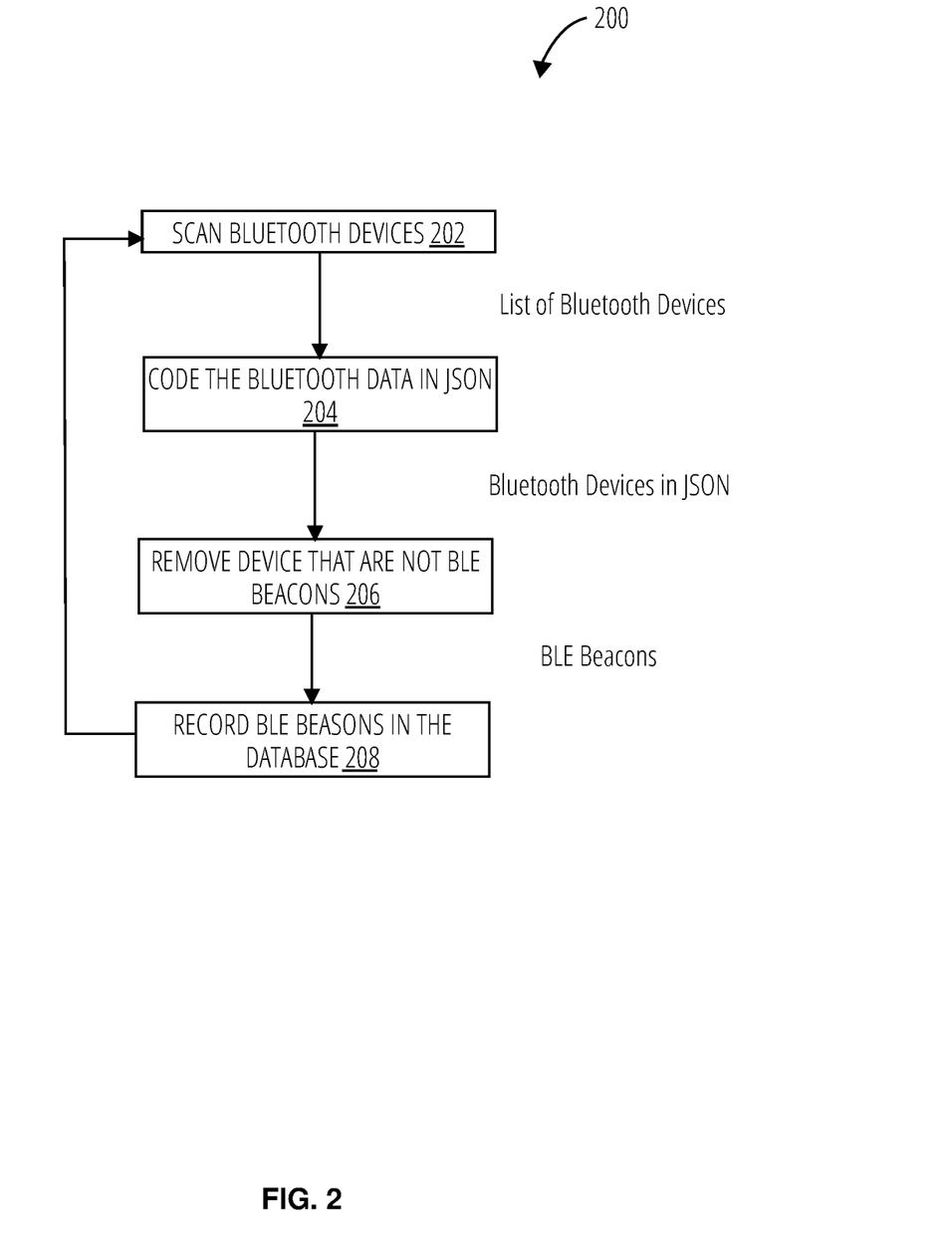
FIG. 2 illustrates a BLE scan routine 200 in accordance with one embodiment.

FIG. 2 illustrates an embodiment for a BLE scan routine 200 that implements the scanning for and reading of the BLE beacon 118 through the BLE receiver 116. The BLE scan routine 200 is executed periodically, often enough to detect an asynchronous BLE beacon 118 that transmits its beacon signal periodically. The period of the BLE scan routine 200 is adjusted to ensure that a BLE beacon 118 signal will be reliably detected taking into account the location and relative velocities of the scanner 100 and the BLE beacon 118.

The BLE scan routine 200 starts in block 202 by scanning all Bluetooth devices within range to retrieve a list of Bluetooth devices. This will include assets being tracked but also other Bluetooth devices such as personal cell phones. The Bluetooth data is then coded into the JSON format block 204 to produce a list of all Bluetooth devices in the JSON format. JSON (JavaScript Object Notation) is a lightweight data-interchange format that is easy for humans to read and write while also being easy for machines to parse. BLE objects that are not asset BLE beacon 118 are removed in block 206 to produce a list of BLE beacon 118 that are part of the system. In block 208, the list of BLE beacon 118 is stored in the local storage 104 in an SQLite database using the JSON format. BLE beacon 118 and RFID tag 112 data is kept in the JSON format when transmitted to the external server 122. It is understood that embodiments may use another common format other than JSON and a database other than SQLite.

Figure 3:
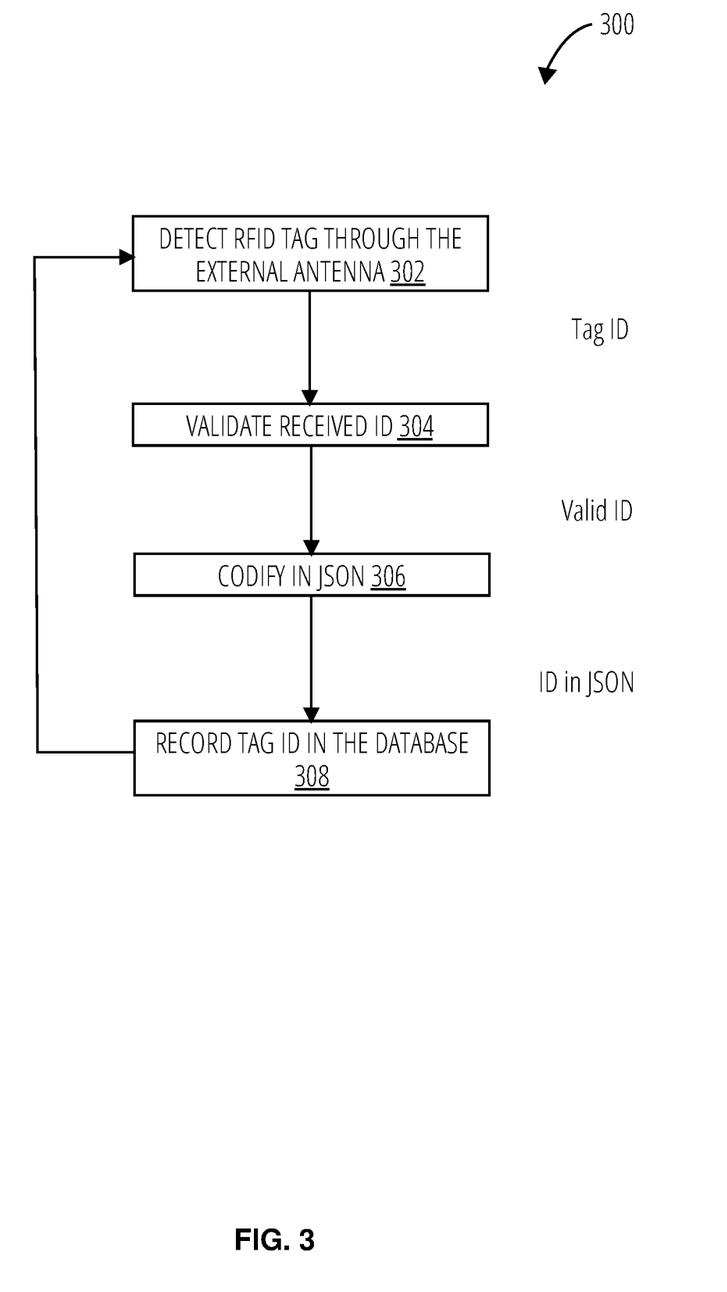
FIG. 3 illustrates an RFID scan routine 300 in accordance with one embodiment.

FIG. 3 illustrates an embodiment for an RFID scan routine 300 that implements the scanning for and reading of the RFID tag 112 through the RFID receiver 110. The RFID scan routine 300 is executed periodically, often enough to detect an asynchronous RFID tag 112 that responds to the scanner 100 when in range. The period of the RFID scan routine 300 is adjusted to ensure that an RFID tag 112 signal will be reliably read taking into account the location and relative velocities of the scanner 100 and the RFID tag 112. In some embodiment, the RFID receiver 110 will not be used and the RFID scan routine 300 will not be run until the BLE scan routine 200 detects an asset within range. As the RFID receiver 110 antenna requires a significant amount of power, powering down the RFID receiver 110 periodically serves to reduce the power consumption of the scanner 100.

The RFID scan routine 300 starts in block 302 by when an RFID tag 112 is detected by the RFID receiver 110. Data is received that includes a tag ID. In block 304 the tag ID is validated to ensure that the tag is associated with an asset being tracked. The tag ID and other data received from the RFID tag 112 is then formatted in JSON format in block 306. In block 308, the tag ID is recorded in the database in the local storage 104.

The scanned data from RFID tag 112 and BLE beacon 118 are saved in a SQLite database in the local storage 104 so that they can be sent through HTTPs requisition to an external server 122. The JSON file format is JSON and every beacon or tag that is read has their attributes saved in this way.

Figure 4:
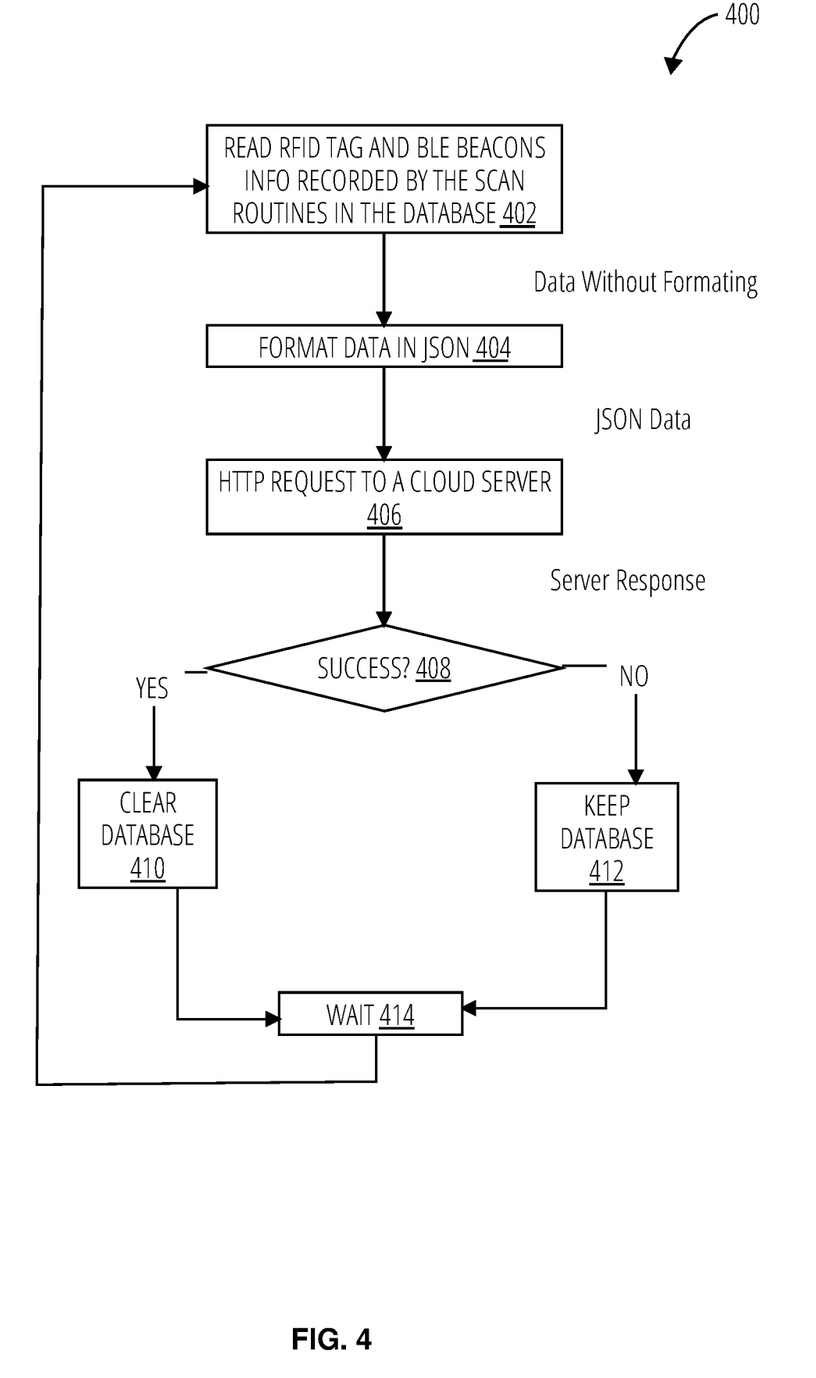
FIG. 4 illustrates a send routine 400 in accordance with one embodiment.

FIG. 4 illustrates the send routine 400 used to send data to the external server 122. In block 402, the data obtained from the BLE scan routine 200 and the RFID scan routine 300 has been stored in the database in the local storage 104. In block 404 the data from both sources has been converted to the JSON format if required. In block 406 an HTTP request is used to send the data to the external server 122. The processing module 102 then waits to receive a response from the server to indicate the success or failure of the HTTP request (decision block 408). It is understood that other networking protocols other than HTTP may be used to transmit or receive data between the scanner 100 and the external server 122. If the response in negative, indicating a failure, the data is kept in the database in the local storage 104 and retried later. If the response is positive, indicating a successful transfer, the data is cleared from the local storage 104 in block 410. Block 414 implements an appropriate waiting period before returning to block 402 to see if there is any new data to transmit or old data to retransmit.

Figure 5:
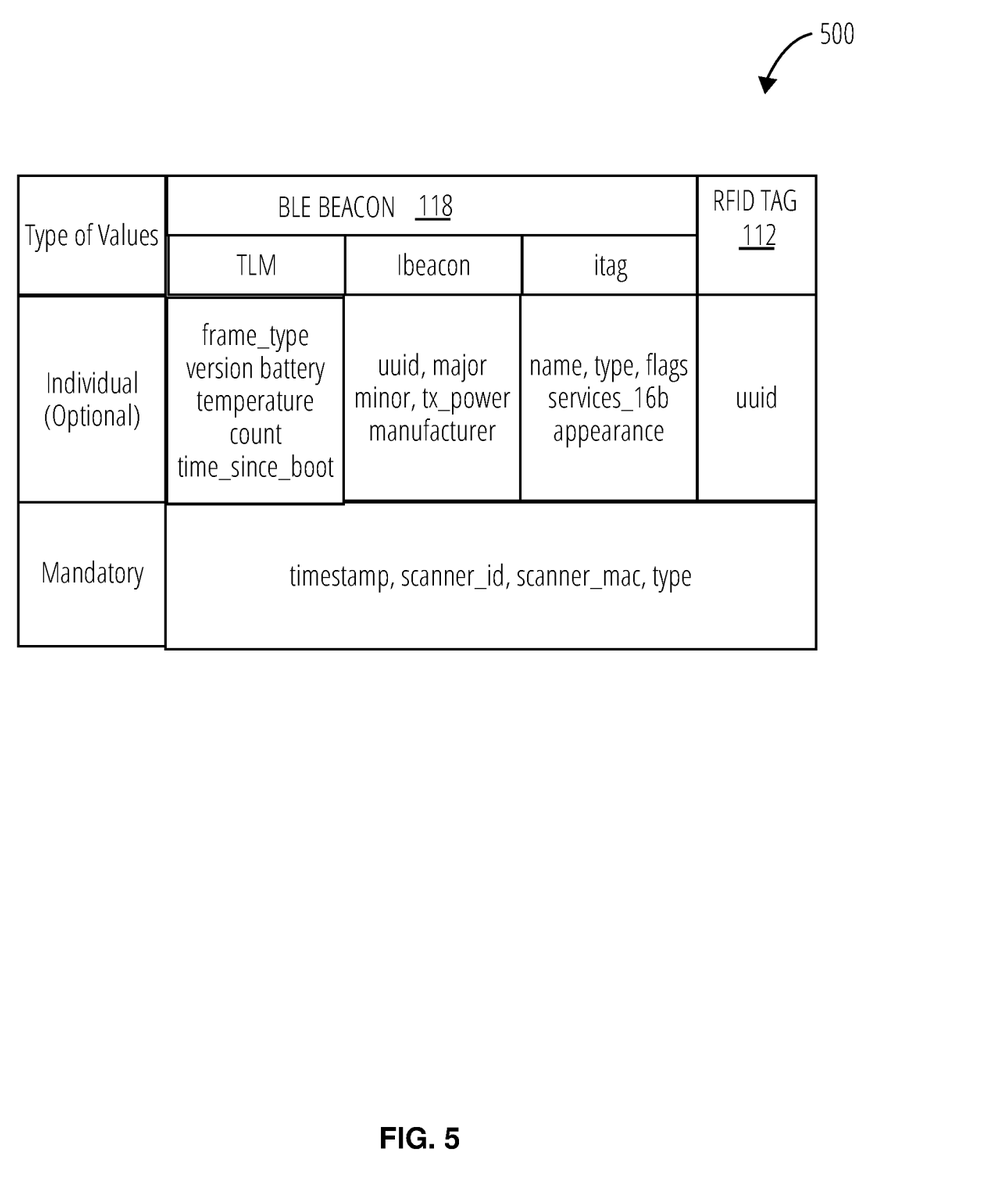
FIG. 5 illustrates an optional and mandatory fields in the protocols 500 in accordance with one embodiment.

The system predefines formats and rules that define the information that is returned by tags and beacons. The information is organized in fields, some of which are mandatory and some of which are optional. FIG. 5 lists an example of mandatory and optional fields for different types of tags and beacons.

In some embodiments, the scanner 100 may support only BLE protocols and the ability to read an RFID tag 112 may be added in a number of ways. One such embodiment involves a simplified RFID receiver 110 that passes the raw captured RFID information directly to the processing module 102. The conversion of the raw RFID data is performed by the processing module 102. The connection between the RFID receiver 110 and the processing module 102 may be done using a generic serial port or similar processor I/O port.

Figure 6:
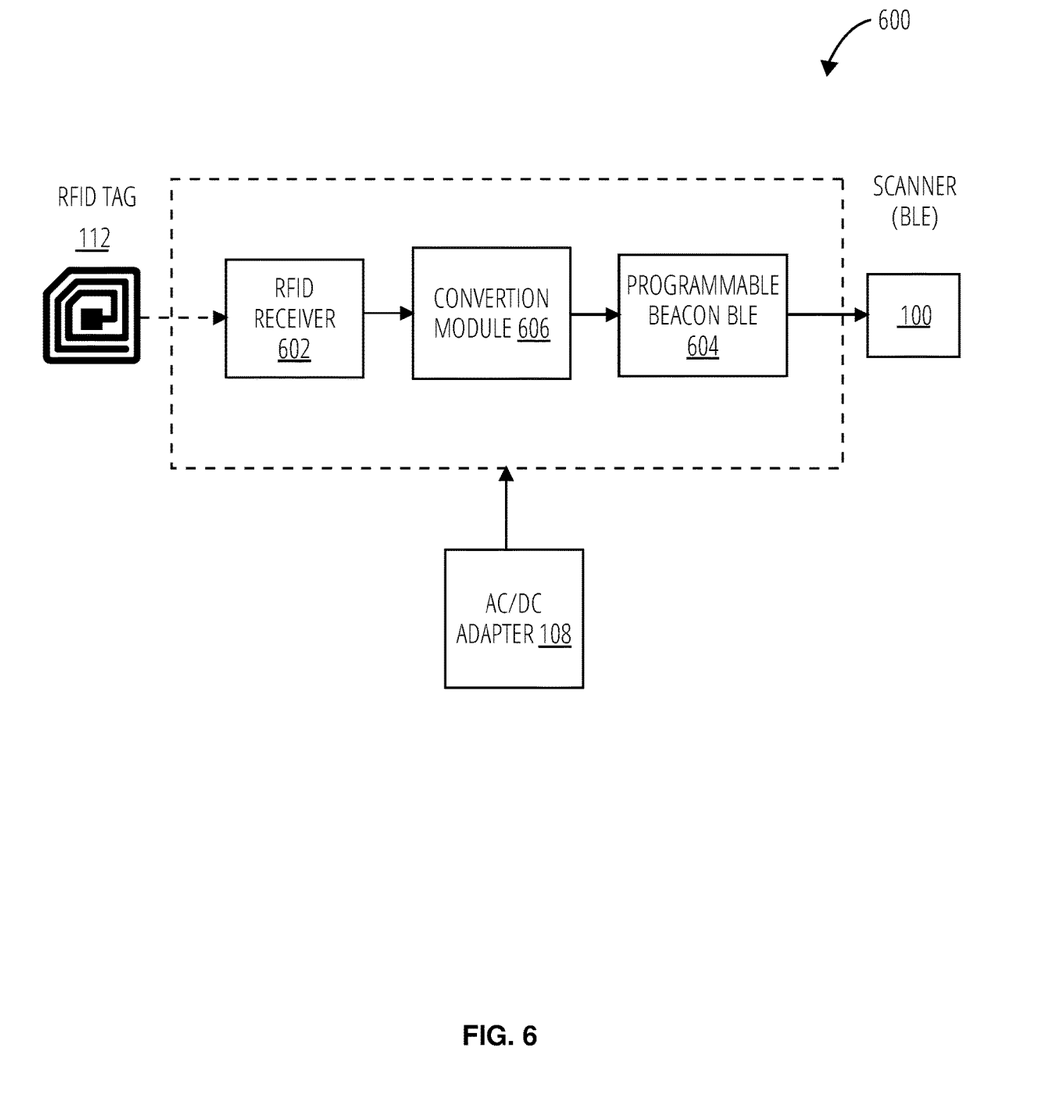
FIG. 6 illustrates an RFID to BLE converter 600 in accordance with one embodiment.

FIG. 6 illustrates another embodiment that comprises the use of an RFID to BLE converter 600. The RFID to BLE converter 600 comprises a second RFID receiver 602, a Conversion Module 606, and a Programmable beacon BLE 604. The RFID tag 112 is scanned by the RFID receiver 110. The RFID tag data is converted by the Conversion Module 606 into a format compatible with BLE protocols and BLE packets. The Conversion Module 606 programs the converted RFID tag information into a Programmable beacon BLE 604 which may then be read as a regular BLE beacon 118 by the BLE receiver 116. In this way, a scanner 100 with only a BLE receiver 116 may support both BLE beacon 118 and RFID tag 112 and sending the data to the external server 122.

When data is collected on the external server 122 and analyzed, the data sources are differentiated as RFID or BLE data, independently of how the data was received by the scanner 100.

Figure 7:
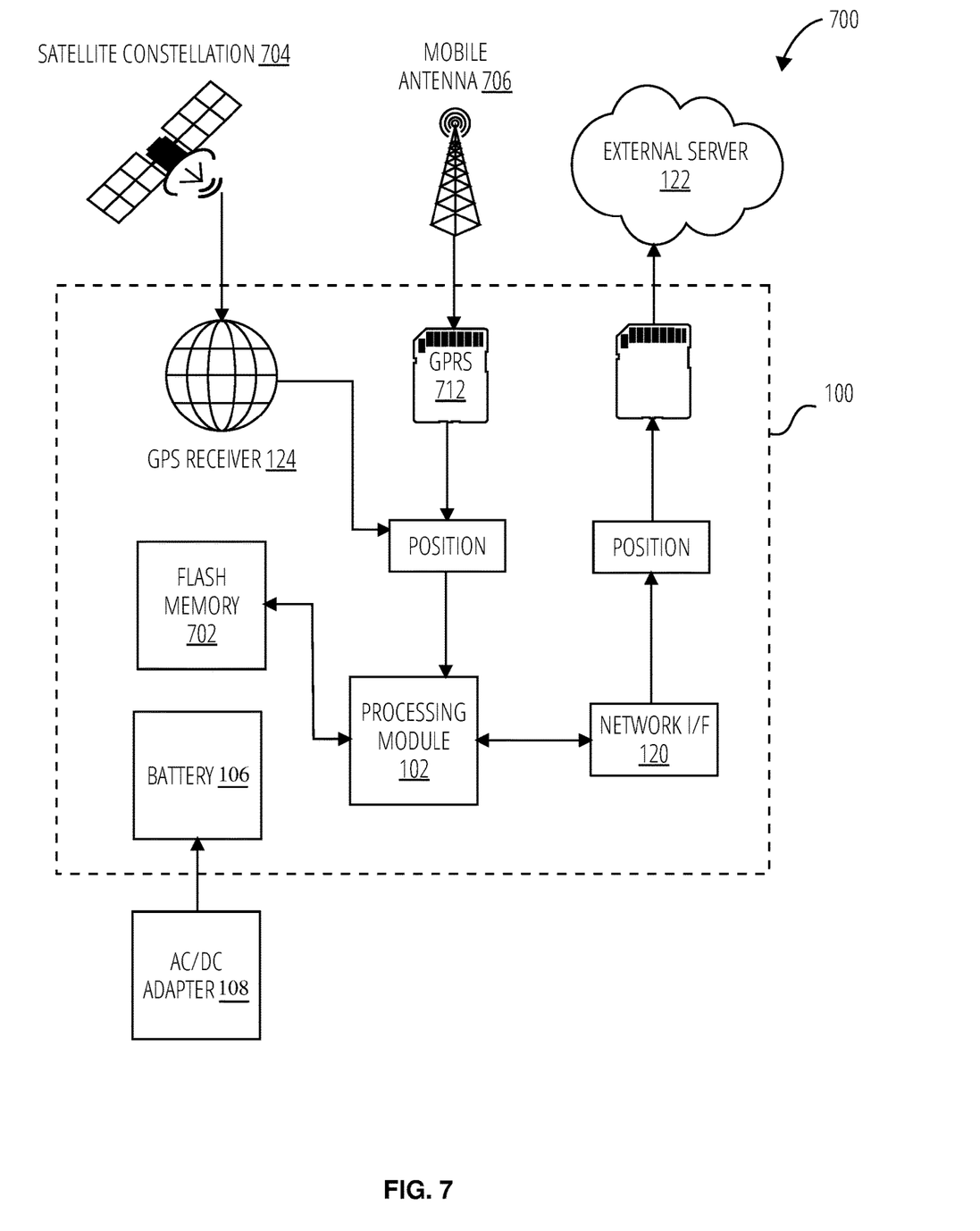
FIG. 7 illustrates a GPS tracker module 700 in accordance with one embodiment.

FIG. 7 illustrates another major aspect of the invention that further comprises a GPS tracker module 700 that may be used to track moving assets over long distances. In this embodiment a GPS receiver 124 is added to the scanner 100 and coupled to the processing module 102. Satellite constellation 704 is shown. In this way, location data may be collected and transmitted to the external server 122. The GPS tracker module 700 may be used with either the BLE receiver 116 or the RFID receiver 110, or both. It may also be a separate device used on its own.

The GPS tracker module 700 is typically in a low power or hibernation mode. Using a vibration or movement sensor, it detects when the asset is in motion which indicates that the asset's position must be periodically updated. This may be done based on elapsed time since the last GPS reading was done or by estimating or measuring the distance moved by the asset. If there has been no movement, a watchdog timer may be used to periodically wake up the GPS tracker module 700 to send a confirmation of the asset position.

A position reading may also be initiated by an external source over various communication links including the use of GPRS 712 through the Mobile antenna 706. Data collected comprises the position, date and time. Date and time data may be obtained either through the GPS receiver 124 or the GPRS 712 connection. If battery powered an indication of the remaining battery level may also be included. The internal database is stored in a Flash memory 702 though other types of memory may also be used. Position data is sent to the external server 122 using an HTTP, HTTPS, or other data transfer protocol. Position data is preserved in the Flash memory 702 until acknowledgement of a successful transfer is received by the GPS tracker module 700 from the external server 122. Once data collection or transfer is complete, the GPS tracker module 700 returns to hibernation mode.

Figure 8:
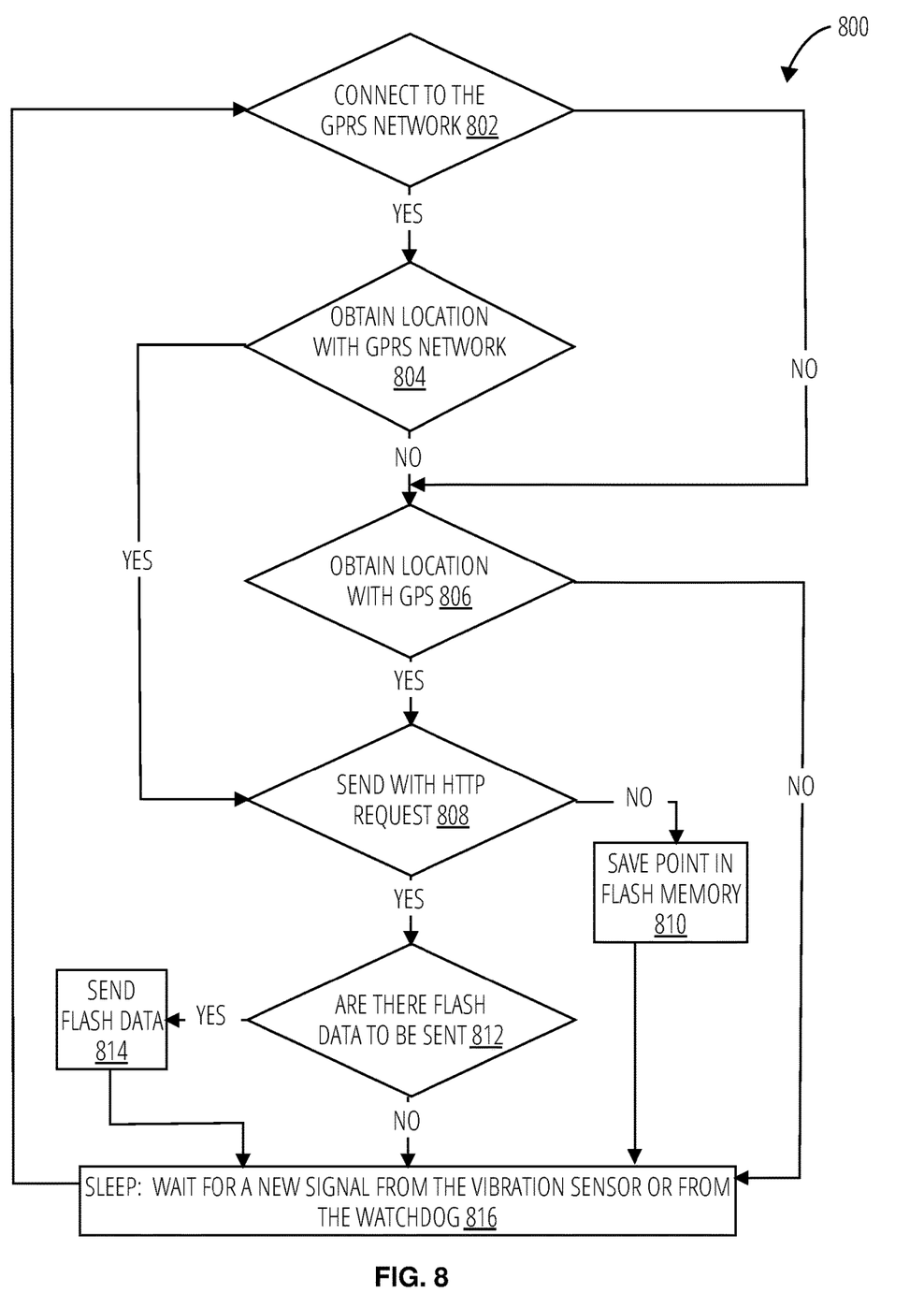
FIG. 8 illustrates a GPS tracker firmware 800 in accordance with one embodiment.

FIG. 8 illustrates how the GPS tracker firmware 800 may operate in some embodiments. When woke from hibernation mode the GPS tracker module 700 will first attempt to connect to the GPRS network 802. If it fails, the GPS tracker module 700 will attempt to obtain location information from the GPS (decision block 806). If successful, the GPS tracker module 700 then tries to obtain location information through the GPRS network 804. If not successful, the GPS tracker module 700 then attempts to obtain location information through the GPS (decision block 806). If this isn't successful, it returns to hibernation mode 816. If location data is obtained either through the GPRS 804 or GPS 806, then an HTTP request is sent 808 to the external server 122. If the HTTP request is not successful, the location data is saved 810 in local Flash memory 702 or local storage 104 and the GPS tracker module 700 again enters hibernation mode 806. Should the HTTP request be successful, the Flash memory 702 is checked 812 for any previously saved data in block 810. If it exists, then this is sent 814 as well before re-entering hibernation mode 816. When in hibernation or sleep mode 816, the GPS tracker module 700 or scanner 100 waits until woken up by a vibration sensor, watchdog, or other means.

Other embodiments may build upon previously described embodiments and create hybrid technology devices.

One additional embodiment is a BLE Collector Scanner, which functions both as a regular BLE scanner, already described, while also acting as a hub, collector, or gateway device within a system comprising many scanners and tags. This gateway scanner would have a robust network connection to the external server 122 and would collect data from other scanners in the system. Data from all scanners would then be transferred to the external server 122 as they arrive or in a batch processing mode. With a Real Time Clock installed, the gateway could also be configured to collect data from scanners and to transfer them to the external server 122 at predefined times to minimize power or to enable scanners to be shut down at night, on weekends, on holiday periods, or during any other time of little or no activity.

A second additional embodiment comprises the use of a "Smart Tag" that would provide location data and function in conjunction with the GPS device in order to save battery power used by the GPS tracker module 700. The Smart Tag, like any other RFID tag, would depend on receiving an RFID signal from an antenna to start working. When a scanner supporting Smart Tags came within range of a Smart Tag it would be able to put the GPS tracker module 700 into hibernation mode with the Smart Tag providing location data instead of the GPS tracker module 700.

A third additional embodiment comprises the use of RFID Smart Tags and the further integration of LoRa wireless nodes having a similar function as the RFID tags. Where there is a LoRa network available, three power states would be possible. A first power state is one close to the construction site where RFID Smart Tags could be used to provide location information. A second power state would be close to urban sites or areas that provide LoRa implementations that include location information. A third power state would be more isolated places, where the GPS tracker would be used. The addition of additional networking and sensing protocols that provide location information would allow for the addition of even more power states.

The ensuing description provides representative embodiment(s) only, and is not intended to limit the scope, applicability or configuration of the disclosure. Rather, the ensuing description of the embodiment(s) will provide those skilled in the art with an enabling description for implementing an embodiment or embodiments of the invention. It being understood that various changes can be made in the function and arrangement of elements without departing from the spirit and scope as set forth in the appended claims. Accordingly, an embodiment is an example or implementation of the inventions and not the sole implementation. Various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention can also be implemented in a single embodiment or any combination of embodiments.

Reference in the specification to "one embodiment", "an embodiment", "some embodiments" or "other embodiments" means that a particular feature, structure, or characteristic described in connection with the embodiments is included in at least one embodiment, but not necessarily all embodiments, of the inventions. The phraseology and terminology employed herein is not to be construed as limiting but is for descriptive purpose only. It is to be understood that where the claims or specification refer to "a" or "an" element, such reference is not to be construed as there being only one of that element. It is to be understood that where the specification states that a component feature, structure, or characteristic "may", "might", "can" or "could" be included, that particular component, feature, structure, or characteristic is not required to be included.

Reference to terms "including", "comprising", "consisting" and grammatical variants thereof do not preclude the addition of one or more components, features, steps, integers or groups thereof and that the terms are not to be construed as specifying components, features, steps or integers. Likewise, the phrase "consisting essentially of", and grammatical variants thereof, when used herein is not to be construed as excluding additional components, steps, features integers or groups thereof but rather that the additional features, integers, steps, components or groups thereof do not materially alter the basic and novel characteristics of the claimed composition, device or method. If the specification or claims refer to "an additional" element, that does not preclude there being more than one of the additional element.

What is claimed is:

1. An electronic scanning apparatus comprising:
   a first wireless receiver configured to to be enabled and disabled and to receive a first data;
   a second wireless receiver configured to initially be in a disabled mode, the second wireless receiver being enabled to receive a second data in response to reception of the first data by the first wireless receiver, the second wireless receiver either returning to the disabled mode in response to and after receiving the second data or the second wireless receiver disables the first wireless receiver in response to receiving the second data;
   a processing module coupled to the first wireless receiver and the second wireless receiver; and a networking interface coupled to the processing module, the networking interface configured to receive the first data and the second data from the processing module and to transmit the first data and the second data to an external server,
   a location detection module configured to receive location data of the electronic scanning apparatus, the networking interface transmitting the location data to the external server, wherein the location detection module is configured to initially be in a disabled mode, the location detection module being enabled to receive the location data when movement of the electronic scanning apparatus is detected,
   wherein the first data and the second data are different types of data, and
   a local storage, the first data and the second data being stored in the local storage prior to transmitting the first data and the second data to the external server, the processing module deleting the first data and the second data from the local storage after receiving an acknowledgement from the external server that the first data and the second data have been successfully received by the external server.

2. The electronic scanning apparatus of claim 1 wherein the first data is received from a first asset tracking device and the second data is received from a second asset tracking device.

3. The electronic scanning apparatus of claim 1 wherein the first data and the second data are converted into a common format before being transmitted to the external server.

4. The electronic scanning apparatus of claim 1 wherein the location detection module is configured to become enabled if the location data has not been received within a predetermined time period.

5. The electronic scanning apparatus of claim 1 wherein the location detection module is configured to become enabled if the location data has not been included with the first data or with the second data.

6. A method for tracking assets, the method comprising:
   reading, by a first wireless receiver, a first data from a first asset tracking device;
   in response to reading the first data, enabling a second wireless receiver, the second wireless receiver reading a second data from a second asset tracking device, the second wireless receiver disables the first wireless receiver in response to receiving the second data, the first asset tracking device and the second asset tracking device associated with an asset, the second wireless receiver being disabled after the second data is received; and transmitting, by a networking interface, the first data and the second data to an external server,
   receiving, by a location detection module, location data of the asset, and the networking interface transmitting the location data to the external server;
   wherein, prior to the location detection module receiving the location data, the location detection module being in a disabled mode, and the location detection module being enabled to receive the location data in response to movement of the asset being detected;
   wherein the first data and the second data are different types of data, and
   storing, by a processing module into a local storage, the first data and the second data prior to transmitting the first data and the second data to the external server, the processing module deleting the first data and the second data from the local storage after receiving an acknowledgement from the external server that the first data and the second data have been successfully received by the external server.

7. The method of claim 6 further comprising, converting, by a processing module the first data and the second data into a common format before being transmitted to the external server.

8. The method of claim 6, comprising, prior to the location detection module receiving the location data, the location detection module being in a disabled mode, and the location detection module being enabled to receive the location data in response to no location data being received within a predetermined time period.

9. The method of claim 6 further comprising receiving, by the first wireless receiver or the second wireless receiver, location data of the asset, and the networking interface transmitting the location data to the external server.

10. The method of claim 9, further comprising configuring a location detection module in a disabled mode.

* * * * *